US007576318B2

(12) United States Patent
Malek et al.

(10) Patent No.: US 7,576,318 B2
(45) Date of Patent: Aug. 18, 2009

(54) METHOD AND APPARATUS FOR MASS SPECTROMETRY

(75) Inventors: Robert Malek, Lilienthal (DE); Oliver Lange, Bremen (DE); Reinhold Pesch, Weyhe (DE); Stevan Horning, Delmenhorst (DE)

(73) Assignee: Thermo Finnigan LLC, San Jose, CA (US)

( * ) Notice: Subject to any disclaimer, the term of this patent is extended or adjusted under 35 U.S.C. 154(b) by 389 days.

(21) Appl. No.: 10/573,394

(22) PCT Filed: Sep. 24, 2004

(86) PCT No.: PCT/EP2004/010735

§ 371 (c)(1), (2), (4) Date: Mar. 22, 2006

(87) PCT Pub. No.: WO2005/031290

PCT Pub. Date: Apr. 7, 2005

(65) Prior Publication Data

US 2007/0023630 A1 Feb. 1, 2007

(30) Foreign Application Priority Data

Sep. 25, 2003 (GB) ................................ 0322484.7

(51) Int. Cl.
*B01D 59/44* (2006.01)
*H01J 49/00* (2006.01)

(52) U.S. Cl. ....................... 250/282; 250/281; 250/283; 250/288; 250/397

(58) Field of Classification Search ................. 250/282, 250/281, 283, 288, 397
See application file for complete search history.

(56) References Cited

U.S. PATENT DOCUMENTS 3,997,298 A 12/1976 McLafferty et al.
4,686,365 A 8/1987 Meek et al.

(Continued)

FOREIGN PATENT DOCUMENTS

WO WO 2004/068523 A2 8/2004

OTHER PUBLICATIONS

Gorshkov et al., "A dual-trap design and its applications in electrospray ionization FTICR mass spectrometry," Analytical Chem, vol. 67 (No. 7), p. 1307-1314, (Apr. 1, 1997).

(Continued)

*Primary Examiner*—Nikita Wells
(74) *Attorney, Agent, or Firm*—Charles B. Katz

(57) ABSTRACT

The present invention relates to mass spectrometry and, more particularly, to the scheduling of the steps involved in performing mass spectrometry. The present invention will be of particular benefit to types of mass spectrometry that generate large quantities of data and hence give rise to lengthy data-processing. The present invention provides a method of mass spectrometry comprising a plurality of cycles, each cycle comprising the steps of (a) preparing ions to be analysed by a mass spectrometer; (b) using a detector of the mass spectrometer to collect data from the ions prepared in step (a); and (c) processing the data collected in step (b) with processing means; wherein at least a part of step (a) and/or a part of step (b) of a cycle is performed concurrently with part (c) of a previous cycle.

18 Claims, 6 Drawing Sheets

U.S. PATENT DOCUMENTS

| | | | | |
|---|---|---|---|---|
| 5,179,278 | A | 1/1993 | Douglas | |
| 5,233,190 | A * | 8/1993 | Schlereth et al. | 250/291 |
| 6,342,393 | B1 | 1/2002 | Hofstadler et al. | |
| 2006/0038119 | A1 * | 2/2006 | Guevremont et al. | 250/282 |
| 2008/0046194 | A1 * | 2/2008 | Antonov et al. | 702/27 |

OTHER PUBLICATIONS

Perkins et al., "Probability-based protein identification by searching sequence databases using mass spectrometry data," Electrophoresis, p. 3551-3567, (Mar. 20, 1999).

Yates III, John R., "Mass spectrometry and the age of the proteome," J. of Mass Spectrom, Wiley, p. 1-19, (Mar. 20, 1998).

P. Kofel et al., "External Trapped Ion Source for Ion Cyclotron Resonance Spectrometry," International Journal of Mass Spectrometry and Ion Processes, Elsevier Science Publishers B.V. (Amsterdam, Netherlands), pp. 237-247, (1989).

Steven A. Hofstadler et al., "Fringing Field Ion Trap for Sensitivity Enhancement in an External Source FTMS," Proc. 38th ASMS Conference Mass Spectrom. Allied Topics, pp. 1456-1457, (1990).

* cited by examiner

METHOD AND APPARATUS FOR MASS SPECTROMETRY

BACKGROUND OF THE INVENTION

The present invention relates to mass spectrometry and, more particularly, to the scheduling of the steps involved in performing mass spectrometry. The present invention will be of particular benefit to types of mass spectrometry that generate large quantities of data and hence give rise to lengthy data-processing. Examples of data-rich spectrometry include quadrupole time of flight (QTOF), nuclear magnetic resonance (NMR) and Fourier transform Orbitrap (FT-O). Details of an Orbitrap system can be found in U.S. Pat. No. 5,886,346.

High-resolution mass spectrometry is widely used in the detection and identification of molecular structures and the study of chemical and physical processes. A variety of different techniques are known for the generation of mass spectra using various trapping and detection methods. The present invention is applicable to many of these techniques.

One such technique is Fourier Transform Ion Cyclotron Resonance (FT-ICR). FT-ICR uses the principle of a cyclotron, wherein a high-frequency voltage excites ions to move in a spiral within an ICR cell. The ions in the cell orbit as coherent bunches along the same radial paths but at different frequencies, the frequency of the circular motion (the cyclotron frequency) is proportional to the ion mass. A set of detector electrodes are provided and an image current is induced in these by the coherent orbiting ions. The amplitude and frequency of the detected signal are indicative of the quantity and mass respectively of the ions. Mass and frequency spectra are obtainable by carrying out a Fourier Transform of the 'transient', i.e. the signal produced at the detector's electrodes.

FIG. 1 shows a known mass spectrometer 10, that is operated as follows. Samples are prepared in an optional sample preparation stage 12 with ions being generated in an ion source 14 before being stored in an ion trap 16. When desired, the ions are transmitted to an ion cyclotron resonance (ICR) cell 20 via ion optics 18. The ion transmission and capture in the ICR cell 20 can occur via two well-known schemes: gated trapping or continuous trapping. The ions in the ICR cell 20 are excited by a radio-frequency signal provided by an excitation system 22 operated under the control of a distributed computer system 26. The transient is detected by detection hardware 24 (amplifiers and other analog circuitry) before being digitized at 28 and passed to the control computer 30. When a complete signal has been detected by the hardware 24, the transient data are either sent directly to the user data system 32 for storage or is processed by the control computer 30 to produce frequency or mass spectra peaks lists. Any combination of transient data can be displayed. In addition, simple decisions for controlling the next data acquisition cycle are possible where the transient data are processed. A more detailed description of an FT-ICR spectrometer can be found in our co-pending Patent Application No. GB0305420.2.

The method of operation of the mass spectrometer of FIG. 1 can be simply summarized as shown in FIG. 2. The steps are as follows:

(i) ionization in the ion source at 34;

(ii) ion collection and preparation in the ion trap at 36;

(iii) ion transmission to the ICR cell at 38;

(iv) ion detection in the ICR cell (i.e. transient data collection) at 40;

(v) processing of the transient data at 42; and (vi) storage of the processed data at 44.

Once storage step 44 has been completed, a new cycle may begin with ionization step 34 followed by sample preparation step 36 as possibly modified by the results of the transient data processing step 42 of the previous cycle. Often, the processing step at (v) is omitted and instead the data collected at step (iv) is merely dumped direct to a computer disk. The time taken for each step/steps is shown in FIG. 2. As can be seen the longest steps are for data detection and data processing 40 and 42, and these steps are performed successively. This is because the data collected in one cycle, once processed, may be used to control the ion collection and preparation in the following cycle.

SUMMARY OF THE INVENTION

Against this background, and from a first aspect, the present invention resides in a method of mass spectrometry comprising a plurality of cycles, each cycle comprising the steps of: (a) preparing ions to be analysed by a mass spectrometer; (b) using a detector of the mass spectrometer to collect data from the ions prepared in step (a); and (c) processing the data collected in step (b) with processing means; wherein at least a part of step (a) and/or (b) of a cycle is performed concurrently with step (c) of the previous cycle.

By performing certain steps of one cycle concurrently with steps of the previous cycle, greater overall efficiency can be achieved. The benefit is great because the two most time-consuming steps—ion detection and data processing—are performed in parallel. As the two steps are wholly independent of one another, there is no conflict in operating the steps concurrently.

To date, the delay inherent in performing steps (a), (b) and (c) successively has not posed a problem and has become the standard that is adopted unquestioningly. However, we have appreciated that considerable benefits can be enjoyed using parallel operating in new techniques such as chromatography in Fourier transform mass spectrometers. In chromatography, any delay between ion preparation for each cycle is undesirable a it causes uncertainty as to whether a parent ion is still present.

The ion "preparation" of step (a) should be construed broadly and may comprise any of ion generation, ion handling (e.g. ion fragmentation, selective accumulation of ions, electrospray injection (ESI), and matrix-assisted laser desorption of ions (MALDI)), ion trapping and transmission of ions to an ICR cell or the like. Data collection using a detector at step (b) corresponds to ion detection within an ICR cell or other suitable detector and may comprise detecting a transient in an ICR cell, as described previously. Data processing at step (c) corresponds to manipulation of the data collected at step (b) rather than mere data collection. For example, this data processing may comprise obtaining a Fourier transform of the transient to obtain a mass spectrum and/or processing the data to allow storage in a reduced form (e.g. rather than storing an entire mass spectrum, just information relating to the peaks may be stored). The processing means may form part of the mass detector, such as a processor chip located in a control panel, but is a separate entity from the detector. Alternatively, the processing means may be physically separate from the mass spectrometer, e.g. a personal computer connected to the mass spectrometer by a serial cable or the like.

Optionally, the method may comprise the step of starting step (a) of a cycle upon completion of step (b) of the previous cycle. This may be immediately upon completion or after a short delay. Alternatively, the method may comprise the step of starting step (a) of a cycle during step (b) of the previous cycle. In this latter case, the method may optionally comprise the step of starting step (b) of a cycle upon completion of step (b) of the previous cycle, such that each data collection step (b) is performed sequentially. Preferably, the method comprises the step of controlling step (a) and/or step (b) of a cycle in response to data processed in step (c) of a previous cycle. This allows experiments to be tailored to results obtained in initial scans. Optionally, step (b) may further comprise making available a sample of data collected during an initial period thereof for processing in step (c) while the remainder of the data collection of step (b) continues. Using such a preview scan affords many advantages. Preferably step (a) and/or step (b) of a cycle is controlled in response to a sample of data processed in step (c) of a previous cycle. For example, these steps may be aborted in view of the previously acquired preview scan. The sample of data may have been collected in the immediately preceding cycle. The method may be used with a hybrid spectrometer comprising first and second detectors. In this case, the method may further comprise the step of injecting ions into the first detector from the second detector in response to a sample of data processed in step (c). In addition, injection may be made in response to a signal from the first detector as well. The first detector may be part of the ion trap and the second detector may be part of the ICR cell. The ICR cell may be used for FT-ICR data collection. Alternatively, the second detector may be a mass spectrometer configured to perform time-of-flight experiments. A further alternative is for the first and second detectors to be part of separate static traps, i.e. traps that use static electric and/or magnetic fields, or hybrid mass spectrometers such as trap-Orbitrap or Orbitrap-Orbitrap devices. Optionally, the method may comprise the steps of collecting a full mass spectrometry scan with the first detector and performing a $MS^n$ scan with the second detector.

According to a second aspect, the present invention resides in a method of mass spectrometry comprising a plurality of cycles, each cycle comprising the steps of: (a) preparing ions to be analysed with a mass spectrometer; (b) using the mass spectrometer to collect data from the ions prepared in step (a); and (c) processing data collected in step (b); wherein a sample of the data collected during an initial period of step (b) is processed concurrently with the remainder of the data collection of step (b) and is used to control step (a) and/or step (b) of a subsequent experiment.

By 'experiment' we mean a sequence of ion preparation and ion detection. This experiment may correspond to another full cycle or may merely be a part of a cycle. For example, a single cycle may comprise a plurality of experiments, each experiment involving its own ion preparation and detection procedures, but where the data is collected together and processed as a whole within that single cycle.

Optionally, the sample of data is collected in an ICR cell and, once processed, is used to control step (a) and/or step (b) of a subsequent experiment performed in an ion trap concurrently with collection of the remainder of the data in the ICR cell. Preferably, a full mass spectrometry scan is collected in the ICR cell and a $MS^n$ scan is collected in an ion trap. For example, in one cycle a mass spectrometry scan may be collected in the ion trap and, based upon a sample of data, a series of $MS^n$ scans may be taken in the ion trap timed so as to complete at around the same time as completion of data collection in the ICR cell. Optionally at least step (a) and/or step (b) of a cycle is performed concurrently with step (c) of the previous cycle.

From a third aspect, the present invention resides in a method of mass spectrometry comprising the steps of: (a) preparing ions to be analysed by a mass spectrometer; (b) using a first detector of the mass spectrometer to perform a full mass spectrometry scan of the ions prepared in step (a); (c) preparing further ions to be analysed by the mass spectrometer; and (d) using a second detector to perform a $MS^n$ scan of the ions prepared in step (c); wherein step (c) and/or step (d) is preformed concurrent with step (b).

Again, more efficient operation of as mass spectrometer is achieved using such concurrent operation. Clearly, the best efficiency is achieved when both ion preparation and $MS^n$ ion detection is performed concurrent with detection of the full MS scan.

Optionally, step (b) comprises using an ICR cell as the first detector and/or the second detector is located in an ion storage device.

The method according to the third aspect of the present invention may further comprise the steps of: storing the ions prepared in step (a) in an ion storage device; transferring the stored ions to an ICR cell; using the ICR cell to detect the ions transferred thereto as step (b); storing the further ions prepared in step (c) in the ion storage device; and using detector provided in the ion storage device as the second detector to detect the stored further ions as step (d).

The present invention also extends to a computer program comprising program instructions operable to carry out any of the above methods, and to a computer when programmed with such a computer program and to a computer readable medium having such a computer program recorded thereon.

BRIEF DESCRIPTION OF THE DRAWINGS

In order that the invention may be more readily understood, reference will now be made, by way of example only, to the accompanying drawings in which.

DETAILED DESCRIPTION OF THE EMBODIMENTS

Figure 1:
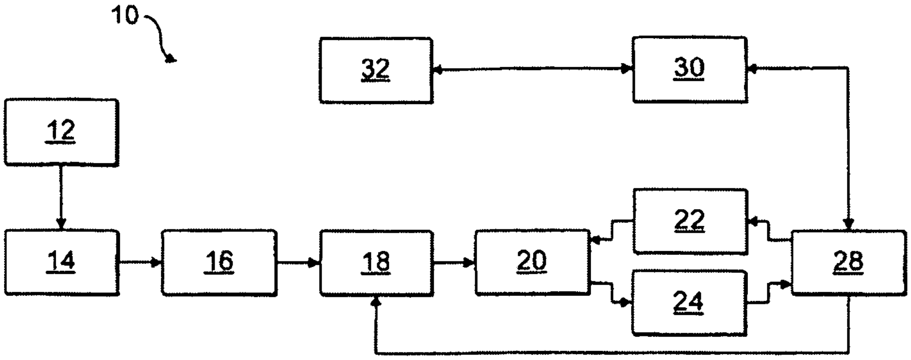
FIG. 1 is a simplified representation of a known mass spectrometer.
Figure 2:
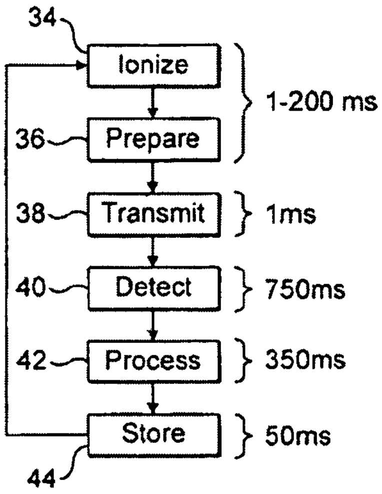
FIG. 2 is a method of operating the mass spectrometer of FIG. 1.
Figure 3:
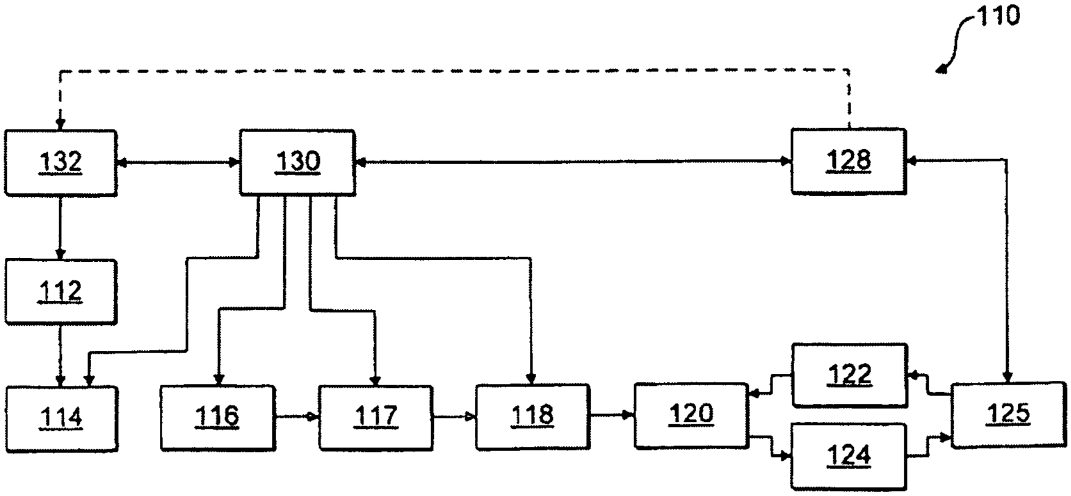
FIG. 3 is a simplified representation of a mass spectrometer suitable for use with the method of the present invention.

A mass spectrometer suitable for use with the present invention is shown in FIG. 3. Many parts correspond to those of the mass spectrometer of FIG. 1 and so like reference numerals (but incremented by 100) are used to label like parts.

Accordingly, FIG. 3 shows a mass spectrometer 110 that operates under the control of a user data system 132 and a system control computer 130 that may be used to control sample preparation at 112. Samples are ionized in an ion source 114 before being transferred to the ion storage devices 116 and 117 that may be, for example, ion traps or ion stores. Depending upon the relative ion capacities of the ion storage device 116 and the ICR cell 120, an intermediate ion storage device 117 may be used to buffer prepared ions from multiple cycles of the ion storage device 116 prior to injection as well-defined packets into the ICR cell 120 via ion optics 118. The ICR cell 120 is optimized for detection of the packets of ions, but it may also be used to perform other ion manipulation such as ion fragmentation through techniques like electron capture dissociation (ECD) or infrared multi-photon dissociation (IRMPD) prior to detection.

The detect cycle in the ICR cell 120 is controlled by computer 128 that uses analog, A/D and D/A circuitry 125, as well as amplifiers both for excitation of the ions and for processing the transient data collected. After gated trapping and a short switching delay (a few ms), ions are excited by a radio frequency signal that is calculated by the computer 130 and transmitted via D/A circuitry 125 and amplifier 122. Typical durations of the excite waveform are 5 ms to 20 ms. After a short delay (the recovery time of the detect hardware of the excitation), the excited ions in the ICR cell 120 are detected by electrodes (not shown): the signal they produce is amplified at 124 and digitized at 125. The computer 128 can start processing the transient data immediately, i.e. even while data acquisition continues. Information from computer 128 may be communicated with the system control computer 130 and/or can be stored directly in the user data system 132.

Figure 4:
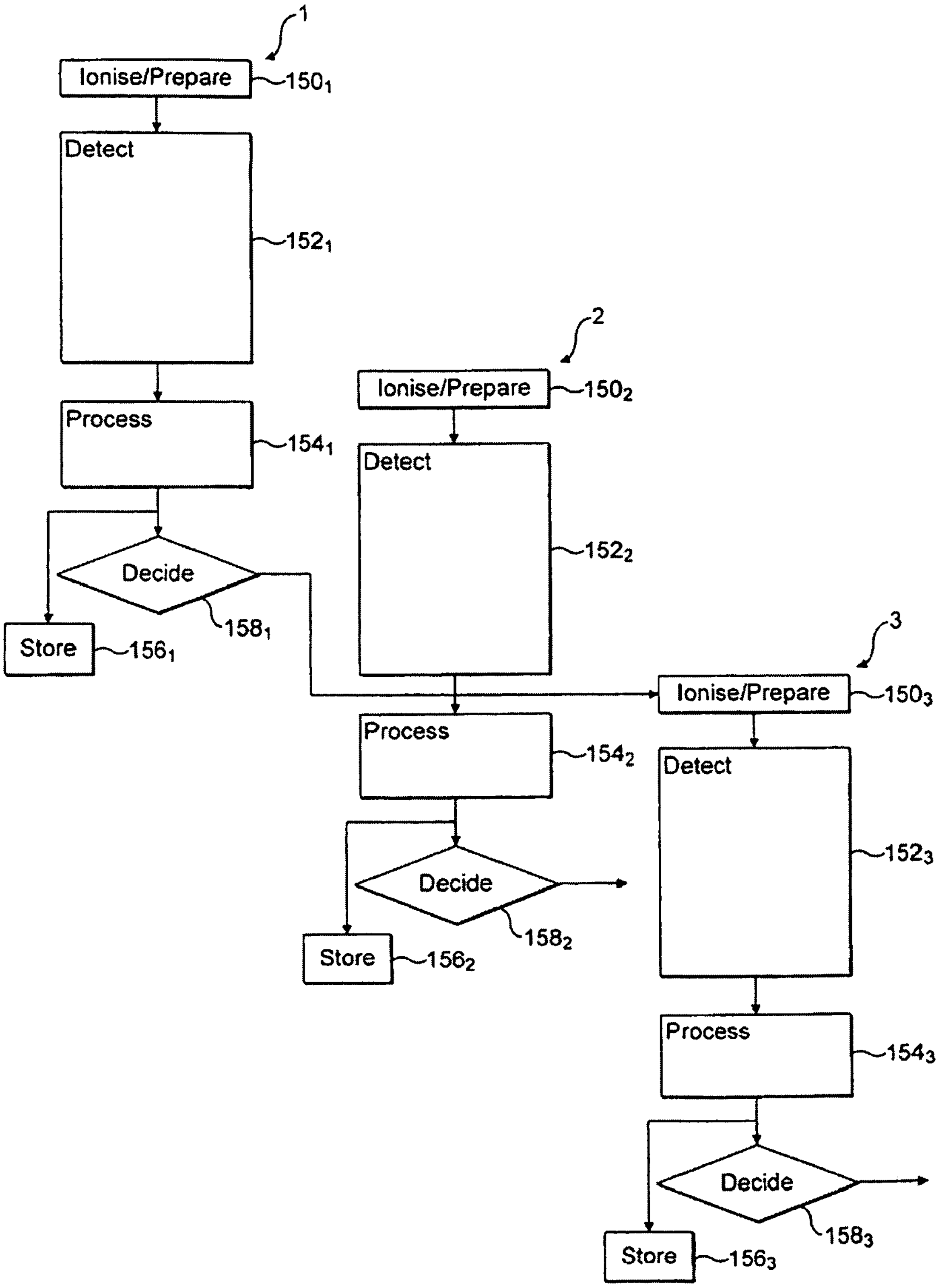
FIG. 4 shows a method of mass spectrometry according to a first embodiment of the present invention.

FIG. 4 shows a method of operating the mass spectrometer of FIG. 3 in accordance with a first embodiment of the present invention. Three cycles 1, 2, 3 of data capture and processing are shown side-by-side in FIG. 4: time is represented approximately in the vertical direction such that relative timings between cycles 1, 2, 3 can be inferred. Moreover, the height of the boxes are approximately proportional to the time taken for the step they represent. Corresponding steps within each cycle are labeled by a common reference numeral, with a subscript denoting the cycle to which they belong.

For the sake of clarity, the ionization, preparation, storage and transmission steps are shown as a single box labeled 150. At the start of the first cycle, ions are collected and prepared at $\mathbf{150}_1$ before transmittal to the ICR cell 120 where the detection step 152 can start. Once a full detection scan has completed, the data collected is processed at $\mathbf{154}_1$ and, conveniently, ions are prepared and collected in the second cycle at $\mathbf{150}_2$ ready for transmission to the ICR cell 120. Data collection for the second cycle can then start: the data collection $\mathbf{152}_2$ will start whilst the data collected during the first cycle at $\mathbf{152}_1$ is being processed at $\mathbf{154}_1$ because the ion collection, preparation and transmission step $\mathbf{150}_2$ takes less time than the data processing step $\mathbf{154}_1$. Once the data has been processed in the first cycle $\mathbf{154}_1$, it can be stored at $\mathbf{156}_1$ in the user data system 132: generally this step occurs concurrently with the ion detection step of the second cycle $\mathbf{152}_2$.

As will be clear from FIG. 4, once the data has been processed at $\mathbf{154}_1$, it is used by the system control computer 130 to decide at $\mathbf{158}_1$ whether or not to continue obtaining data and, if continuing, how any of the ion collection, ion preparation 150 or ion detection steps 152 proceed. As mentioned above, the ion collection, preparation and transmission steps of the second cycle all occur before the data processing step of the first cycle $\mathbf{154}_1$ is complete. In addition, the data collection step of the second cycle $\mathbf{152}_2$ begins before the data processing step of the first cycle $\mathbf{154}_1$ is complete. As a result, the data processing step of the first cycle $\mathbf{154}_1$ can be used to influence the operation of only the third and subsequent cycles.

It will be clear that the description above is couched in terms of the first and second cycles but applies equally well to the second and third cycles, the third and fourth cycles, and so on.

A typical sequence of ion collection, preparation 150 and detection 152 and data processing 154 takes around 1 s. Depending upon the samples and the desired mass resolution, the detect time 152 can be shortened significantly. The data processing step 154 increases in time as the mass range increases or the amount of data increases.

Figure 5:
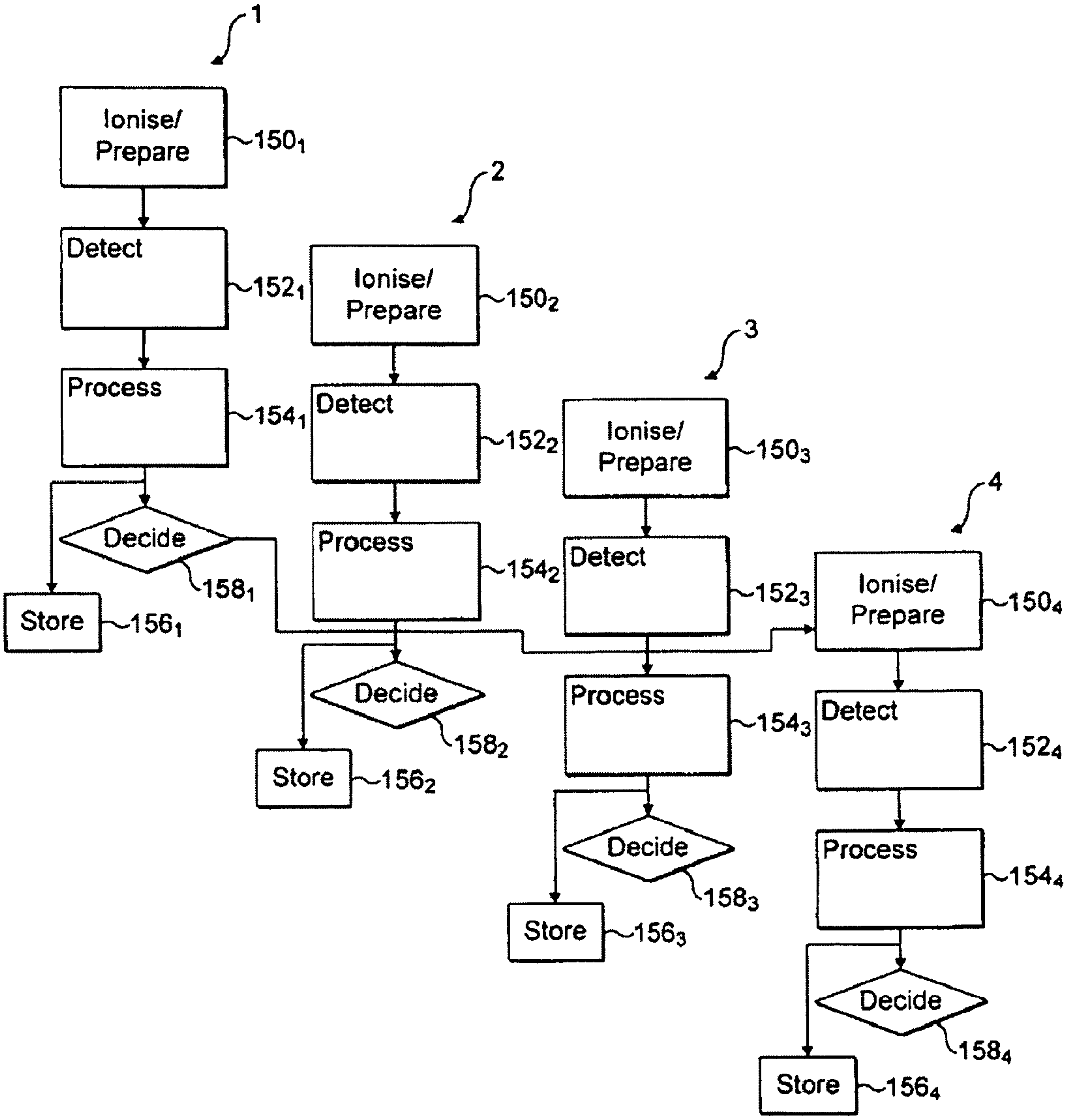
FIG. 5 corresponds to FIG. 4, but shows a method of mass spectrometry according to a second embodiment of the present invention.

FIG. 5 shows an alternative embodiment of the present invention. Much detail is shared with the embodiment of FIG. 4 and so common reference numerals are used where appropriate. In addition, descriptions of like parts will not be repeated here for the sake of brevity. In this second embodiment, the overlap of successive cycles 1, 2, 3, 4 is greater because one cycle is started whilst the ion detection step 152 of the previous cycle is still in operation. This is achieved by generating, preparing and storing ions whilst data collection of the previous cycle continues. The stored ions for the following cycle are ready for transmission as soon as the data detection step 152 of the previous cycle is complete. Using such a method, steps from three or even four successive cycles may all be in operation in the mass spectrometer 110 in any one instance. For example, the data from the first cycle may be written to the store at $\mathbf{156}_1$ whilst the data from the second cycle is being processed at $\mathbf{154}_2$ whilst the data from the third cycle is being detected at $\mathbf{152}_3$ whilst the ions in the fourth cycle are being collected and prepared $\mathbf{150}_4$. Such an arrangement is shown in FIG. 5 for the most advantageous case where ion preparation 150, detection 152 and data processing 154 all require approximately the same amount of time. This would correspond to a case, for example, where a low ion current is produced by the ion source 114 and the ions are isolated and fragmented in a RF ion trap 116 with a mass range of interest from 100 to 1,000 with a desired resolution of 100,000 at 400. This would lead to approximately equal ion preparation 150, detection 152 and data processing 154 steps of around 0.7 s.

At a first glance, this second embodiment looks superior to the first embodiment in that the parallel processing is optimized. However, there is a disadvantage in that the increased efficiency means that data processed in the first cycle at $\mathbf{154}_1$ cannot be used to influence any cycle before the fourth and subsequent cycles.

Figure 6:
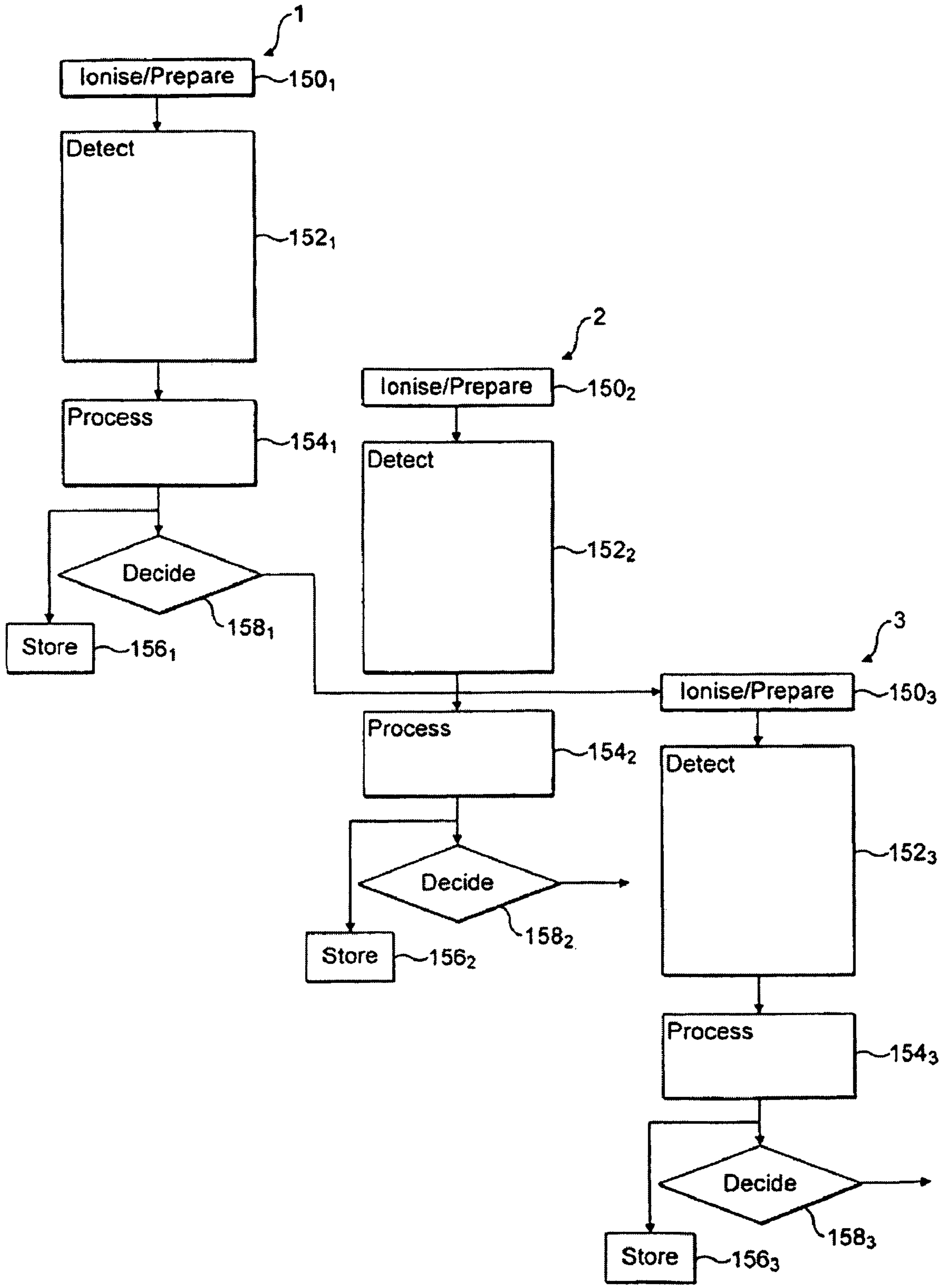
FIG. 6 corresponds to FIG. 5, but for a case with a short ion preparation time.

In real systems, the duration of the ion preparation 150, detection 152 and data processing 154 steps can vary relative to each other, such that one may be far longer than the others and so will be rate determining. The relative timing of each step must be accounted for by the decision processes 158 and may require the system control computer 130 to delay ionization or prolong storage of the ions where, for example, the ion preparation time 150 is short compared to the ion detection time 152. With some timing schemes, the data from the first cycle $\mathbf{154}_1$ can be used to influence ion preparation $\mathbf{150}_3$ in the third cycle, as illustrated in FIG. 6.

Figure 7:
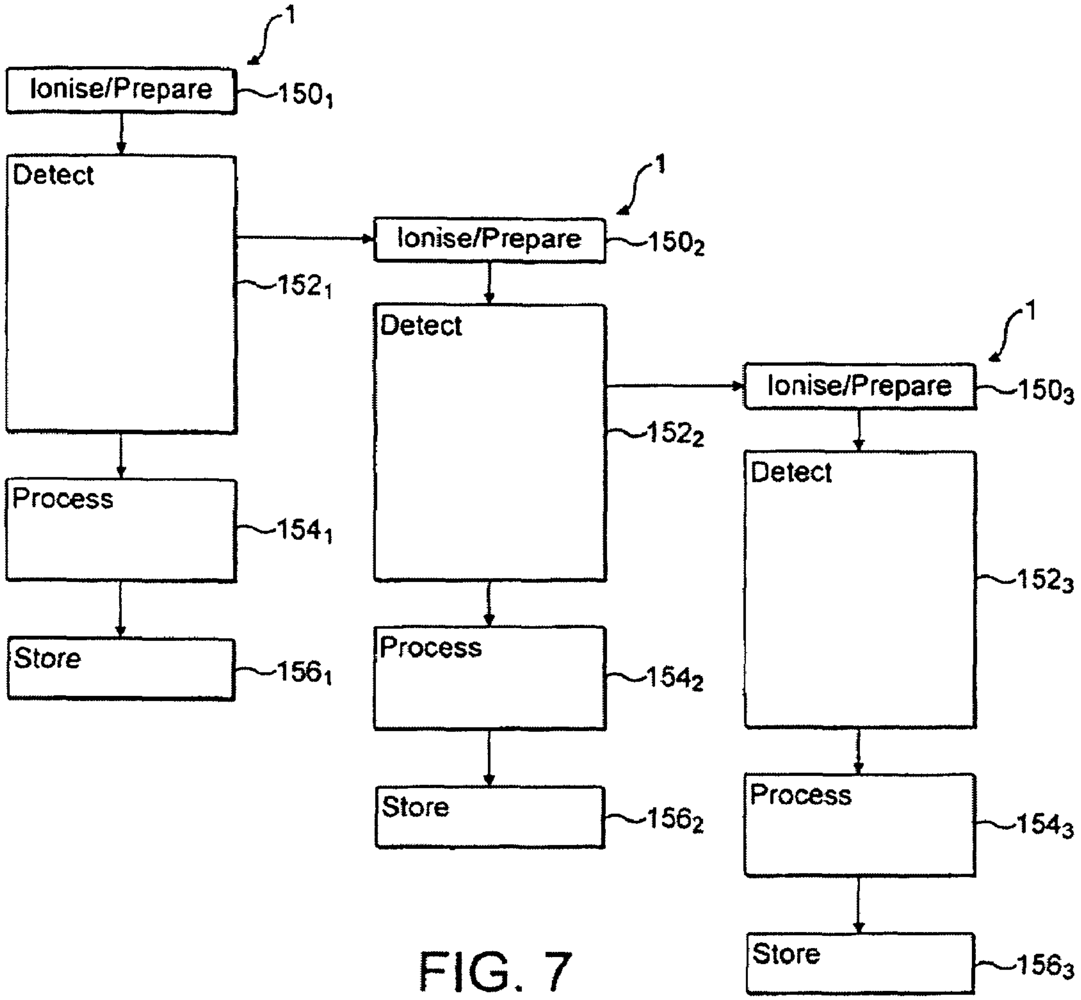
FIG. 7 corresponds to FIG. 4, but shows a method of mass spectrometry according to a third embodiment of the present invention.

FIG. 7 shows a third embodiment of the present invention that incorporates a modification to the ion detection 152 and data processing 154 steps. Usually, the data acquisition parameters are set before the start of a cycle, with that cycle being implemented as pre-determined. Ion detection 152 is performed for the pre-determined time and only then is a Fourier Transform taken (for the case of FT-ICR) at 154. The duration of the detection step 152 determines the resolution that may be achieved (and is proportional therewith). As will be appreciated, the transient data is collected continually during the ion detection step 152. A typical transient size is 1024 ksamples: this high number allows high resolution with simultaneous detection of low masses.

Rather than waiting for the entire ion detection step 152 and data processing step 154 to complete before a decision 158 can be made as to how, or if, to adapt subsequent ion preparation 150, ion detection 152 or data processing steps 154; a sample from the start of the transient is processed immediately at $\mathbf{160}_2$ whilst the rest of the ion detection step $\mathbf{152}_1$ continues. Although the statistics are reduced in proportion to the brevity of the sample, any length of sample can be processed to generate a low-resolution mass spectrum, as indicated at $\mathbf{160}_2$ of FIG. 7. Although resolution will be degraded, it is adequate for assessing how the next cycle is to be performed or whether a sequence of scans are to be aborted.

In this embodiment, the first 32 k samples of transient data are used in the decision process $\mathbf{160}_2$. However, the length of the sample can be varied within the timing constraints of the series of cycles. It may be that the sample of data is not particularly small in relation to the whole of the data. Where timing allows, for example, the sample may extend over half or more of the whole of the data. In this way, the total detection time, mass spectrum generation time and decision making time can take less that 100 ms. The ion collection and preparation of the very next cycle $\mathbf{150}_2$ can start as soon as the decision step $\mathbf{160}_2$ is complete and the ions will be ready for transmission to the ICR cell 120 as soon as the ion detection step $\mathbf{152}_1$ of the previous cycle is complete.

Furthermore, the ion detection 152 of successive cycles can be performed in parallel, as already described. Likewise, the data processing steps 154 of successive cycles can also be performed in parallel.

This third embodiment shown in FIG. 7 is especially useful where the first cycle corresponds to a full mass analysis and the second analysis corresponds to a MS/MS analysis of ions found in the first scan (or any other $MS^n$ type of scan). The ability to process a sample of transient data and be in a position to abort full data detection is particularly useful when the ion detection step 152 is far longer than the ion preparation step 150, a typical situation for ultra-high mass resolution experiments. New ions can be generated and detected immediately, for example when a best solution is necessary for monitoring a chromatographic process while still desiring ultra-high resolution.

Figure 8:
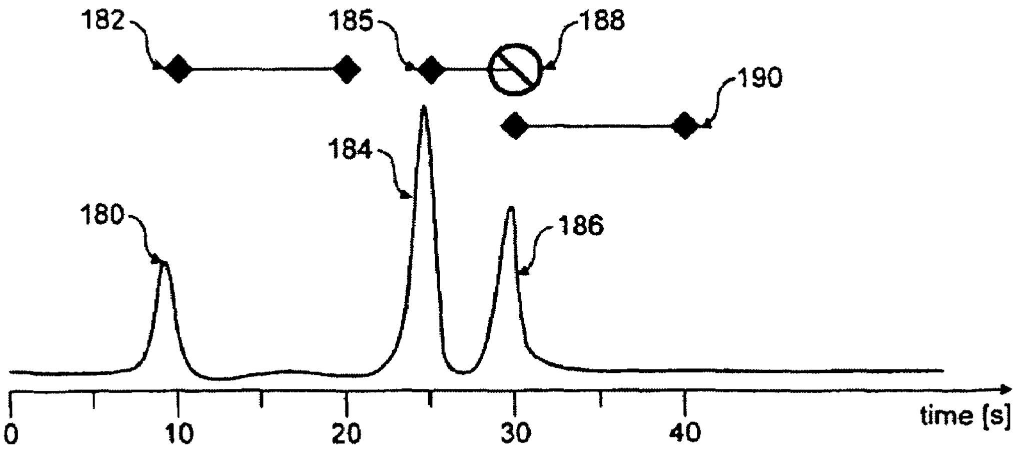
FIG. 8 shows an example time line for illustrating a method of mass spectrometry according to a fourth embodiment of the present invention.

In a fourth embodiment, the method of the present invention is applied to a hybrid mass spectrometer 110 comprising two detectors, namely a combination of a high-resolution ICR cell 120 and a low-resolution ion detector in the ion storage device 116. Providing the ion storage device 116 with a detector allows not only automatic gain control, but also allows the ion storage device 116 to accumulate and detect ions while the ICR cell 120 collects high-resolution data. The use of previous scans collected by the ICR cell 120 (i.e. the first portion of the detection step) and ion storage device data makes it possible to alter data collection sequences by sending ions to the ICR cell 120 whenever desired, e.g. by interrupting data collection in the ICR cell 120 and injecting further ions. Any chromatogram, or other spectrum, finally determined can contain data mixed from both parts of the hybrid mass spectrometer 110. An example is given in FIG. 8, and will now be described.

Ions are accumulated in the ion storage device 116 and detected using a high-speed cycle of 1/10 s per mass spectrum. When the chromatographic peak 180 at 10 s is detected, the ions are transmitted to the ICR cell 120 for an ultra-high resolution scan lasting 10 s, as indicated at 182. Meanwhile, further ions are being prepared as detection of ions in the ion storage device 116 continues. At 25 s, a new peak 184 is detected in the ion storage device 116, triggering transmission of ions to the ICR cell 120 and the start of a further 10 s ultra-high resolution scan as indicated at 184. Continual detection of ions in the ion storage device 116 registers a third peak 186 at 30 s. Decision logic operated by the system control computer 130 regards this peak 186 as being more important than the previous peak 184 found at 25 s. Consequently, the current ultra-high-resolution scan is aborted at 188 without discarding the data, and the ions are injected into the ICR cell 120 for a third ultra-high-resolution scan 190 to start. All information from all the scans (both the ultra-high-resolution scans from the ICR cell 120 and the low-resolution scans from the ion storage device) are sent to the store 132, ordered by the time ionisation took place.

Figure 9:
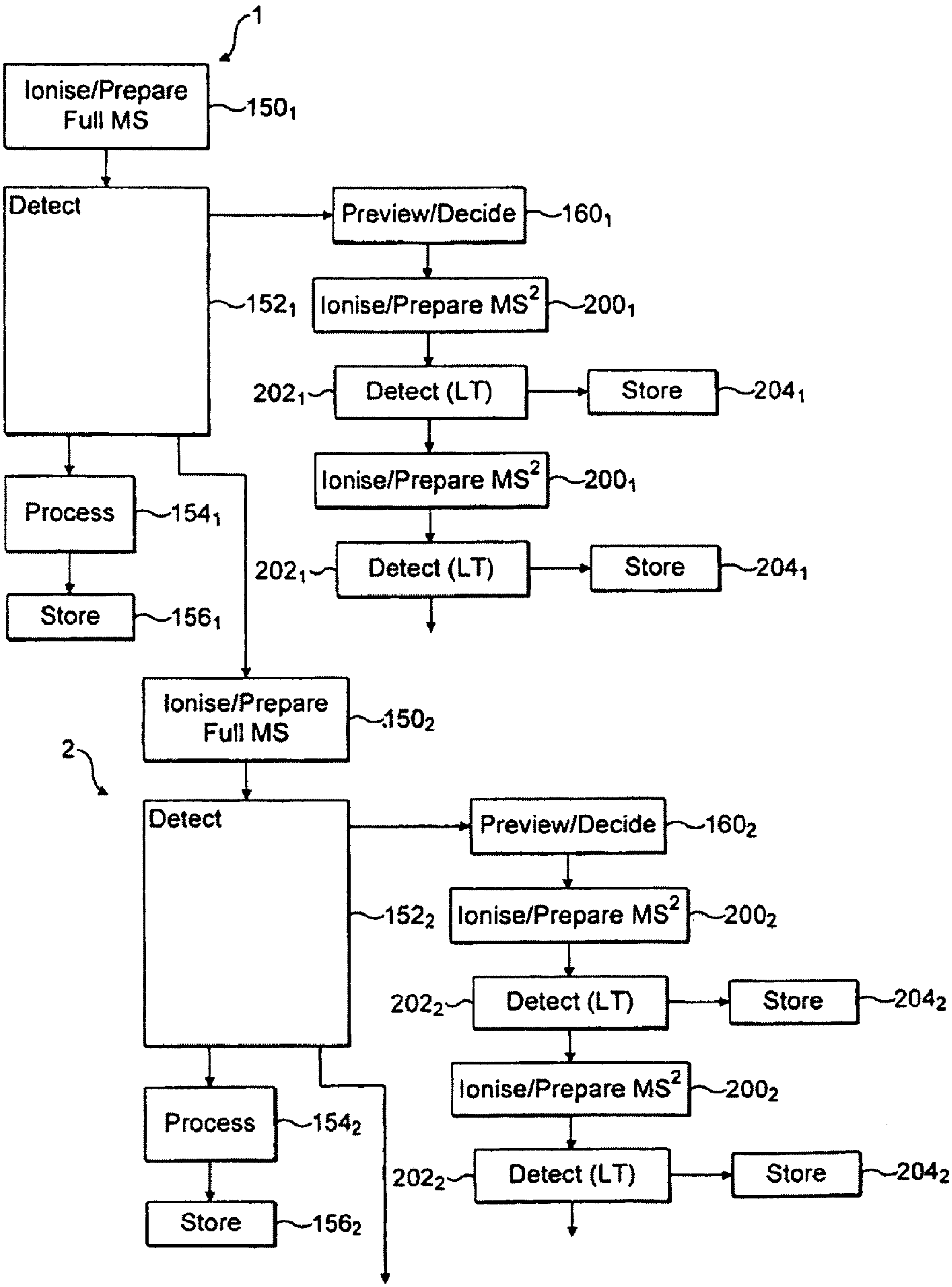
FIG. 9 corresponds to FIG. 4, but shows a method of mass spectrometry according to a fifth embodiment of the present invention.

This principle is applied in a fifth embodiment of the present invention shown in FIG. 9. Ions are prepared in the usual way at $\mathbf{150}_1$ and are subsequently transmitted to the ICR cell 120 for detection at $\mathbf{152}_1$. As described before, a preview is generated at $\mathbf{160}_1$ using an initial sample of the transient data collected during the ion detection step $\mathbf{152}_1$. Based on the information gained from the preview $\mathbf{160}_1$, ions are prepared and stored $\mathbf{200}_1$ in the ion storage device 116 where one or more data acquisitions are taken $\mathbf{202}_1$ using the lower resolution detector and stored at $\mathbf{204}_1$. In this way, ultra-high-resolution scans are collected by the ICR cell 120, while a plurality of MS/MS scans are collected by the ion storage device 116. Once the ICR cell 120 and ion storage device 116 have completed their ion detection steps $\mathbf{152}_1$, $\mathbf{202}_1$, a new cycle of ultra-high-resolution and MS/MS scans begins (with parallel processing being possible, as will be evident from the foregoing description).

The embodiment of FIG. 9 can be modified in accordance with another aspect of the present invention. Whereas FIG. 9 describes an embodiment that generates a preview scan and processes the preview scan at 160 to determine which mass ranges are to be the subject of further MS/MS scans at 200, this need not be the case. In fact, these steps may be omitted such that no preview scan is generated. Rather only a full MS scan is detected using the ICR cell 120 at 152. Then, MS/MS or other $MS^n$ scans are detected using the ion storage device 116. The mass range that is to form the subject of these MS/MS scans can be predetermined, according to expected fragment masses for example. In addition, process step 154 need not be performed in parallel with other data collection at 152 or 202, or ion preparation at 150 or 200. Instead, the data processing at 154 and storage at 156 can be performed at a later time whenever convenient.

The person skilled in the art will appreciate that variations can be made to the embodiments described above without departing from the scope of the invention.

Whilst the foregoing specific description uses the context of FT-ICR spectroscopy, the present invention is of wider application and may be used in other types of spectroscopy. The present invention will be of particular benefit to types of spectroscopy that involve a data-processing step that requires considerable time. Examples include spectroscopy using quadrapole time of flight (QTOF), Fourier transform infrared (FT-IR) and nuclear magnetic resonance (NMR).

The present invention is directed to the scheduling of steps within mass spectrometry, and to scheduling with respect to the data collection and processing in particular. As such, the exact details within each step can be varied quite freely. For example, the exact details of the sample preparation, ion generation, ion preparation, ion collection, ion storage and ion transmission are not crucial to the present invention. The same consideration applies to the data collection and data processing steps. For example, the data processing may comprise obtaining a Fourier transform of transient data in order to obtain information regarding the ions. This information may be presented as a frequency spectrum or a mass spectrum, for example.

Most present Fourier transforms (that are used in FT-ICR at least) require the number of data samples to correspond to a power of two. However, fast Fourier transforms may be used that do not have this restriction. This allows for greater freedom in setting the duration of the ion detection step, for example the length may be varied in discrete steps of 50 ms or less.

The invention claimed is:

1. A method of mass spectrometry comprising a plurality of cycles, each cycle comprising the steps of:

(a) preparing ions to be analysed by a mass spectrometer;

(b) using a detector of the mass spectrometer to collect data representative of the quantities and masses of the ions prepared in step (a); and (c) processing the data collected in step (b) with processing means;

wherein at least a part of step (a) and/or a part of step (b) of a cycle is performed concurrently with part (c) of a previous cycle.

2. A method according to claim 1, comprising the step of starting step (a) of a cycle upon completion of step (b) of the previous cycle.

3. A method according to claim 1, comprising the step of starting step (a) of a cycle during step (b) of the previous cycle.

4. A method according to claim 3, comprising the step of starting step (b) of a cycle upon completion of step (b) of the previous cycle.

5. A method according to claim 1, comprising the step of controlling step (a) and/or step (b) of a cycle in response to data processed in step (c) of a previous cycle.

6. A method according to claim 1, wherein step (b) further comprises making available a sample of data collected during an initial period of step (b) for processing in part (c) while the remainder of the data collection of step (b) continues.

7. A method according to claim 6, comprising the step of controlling step (a) and/or step (b) of a cycle in response to a sample of data processed in step (c) of a previous cycle.

8. A method according to claim 7, wherein the mass spectrometer is a hybrid spectrometer comprising first and second detectors, the method further comprising the step of injecting ions into the first detector from the second detector in response to the sample of data processed in step (c).

9. A method according to claim 8, wherein the first detector is part of an ICR cell and the second detector is part of an ion storage device.

10. A method according to claim 9, comprising the steps of collecting a full mass spectrometry scan with the first detector and performing a $MS^n$ scan with the second detector.

11. A method of mass spectrometry comprising a plurality of cycles, each cycle comprising the steps of:

(a) preparing ions to be analysed with a mass spectrometer;

(b) using the mass spectrometer to collect data representative of the quantities and masses of the ions prepared in step (a); and (c) processing data collected in step (b);

wherein a sample of the data collected during an initial period of step (b) is processed concurrently with the remainder of the data collection of step (b) and is used to control step (a) and/or step (b) of a subsequent experiment.

12. A method according to claim 11, wherein the mass spectrometer is a hybrid spectrometer comprising first and second detectors and wherein the sample of data is collected in the first detector and, once processed, is used to control step (a) and/or step (b) of a subsequent experiment performed with the second detector concurrently with collection of the remainder of the data by the first detector.

13. A method according to claim 12, comprising the steps of collecting a full mass spectrometry scan with the first detector and performing a $MS^n$ scan with the second detector.

14. A method according to claim 12, wherein at least step (a) and/or step (b) of a cycle is performed concurrently with part (c) of the previous cycle.

15. A method of mass spectrometry comprising a plurality of cycles, each cycle comprising the steps of:

(a) preparing ions to be analysed by a mass spectrometer;

(b) using a first detector of the mass spectrometer to perform a full mass spectrometry scan of the ions prepared in step (a);

(c) preparing further ions to be analysed by the mass spectrometer; and (d) using a second detector to perform a $MS^n$ scan of the ions prepared in step (c);

wherein step (c) and/or step (d) is performed concurrent with step (b).

16. The method of claim 15, wherein step (b) comprises using an ICR cell as the first detector.

17. The method of claim 15, wherein the second detector is located in an ion storage device.

18. The method of claim 15, further comprising the steps of:

storing the ions prepared in step (a) in an ion storage device;

transferring the stored ions to an ICR cell;

using the ICR cell to detect the ions transferred thereto as step (b);

storing the further ions prepared in step (c) in the ion storage device; and using detector provided in the ion storage device as the second detector to detect the stored further ions as step (d).

* * * * *